(12) United States Patent
Julien et al.

(10) Patent No.: US 6,273,451 B1
(45) Date of Patent: Aug. 14, 2001

(54) STROLLER AND COMPONENTS THEREOF

(75) Inventors: Christine E. Julien, Reading; Devon T. Siesholtz, Boyertown; Dennis R. Stauffer, Birdsboro, all of PA (US)

(73) Assignee: Graco Children's Products Inc., Elverson, PA (US)

( * ) Notice: Subject to any disclaimer, the term of this patent is extended or adjusted under 35 U.S.C. 154(b) by 0 days.

(21) Appl. No.: 09/377,596

(22) Filed: Aug. 19, 1999

(51) Int. Cl.$^7$ ........................................ B62B 7/08
(52) U.S. Cl. .................. 280/642; 280/47.33; 280/650
(58) Field of Search .................................. 280/642, 641, 280/651, 647, 650, 47.33, 47.38, 47.4

(56) References Cited

U.S. PATENT DOCUMENTS

| | | | |
|---|---|---|---|
| D. 375,473 | 11/1996 | Huang | D12/129 |
| D. 414,144 | 9/1999 | Freese et al. | D12/129 |
| 3,887,210 | * 6/1975 | Funke | 280/87.01 |
| 4,247,216 | 1/1981 | Pansini | 403/109 |
| 4,284,287 | 8/1981 | Esposito | 280/47.37 R |
| 4,660,850 | * 4/1987 | Nakao et al. | 280/642 |
| 4,666,179 | 5/1987 | Adams | 280/655 |
| 4,679,261 | 7/1987 | Stanley et al. | 5/183 |
| 5,257,800 | 11/1993 | Yang | 280/654 |
| 5,308,103 | 5/1994 | Chin-Shung | 280/655 |
| 5,353,900 | 10/1994 | Stilley | 190/18 A |
| 5,431,428 | 7/1995 | Marchwiak et al. | 280/655 |
| 5,454,584 | 10/1995 | Haut et al. | 280/642 |
| 5,482,311 | * 1/1996 | Huang | 280/642 |
| 5,499,702 | 3/1996 | Wang | 190/115 |
| 5,548,864 | 8/1996 | Vosbikian et al. | 15/257.7 |
| 5,590,974 | 1/1997 | Yang | 403/327 |
| 5,605,409 | 2/1997 | Haut et al. | 403/102 |
| 5,725,238 | 3/1998 | Huang | 280/642 |
| 5,779,386 | 7/1998 | Eichhorn | 403/329 |
| 5,871,227 | 2/1999 | Huang | 280/642 |
| 5,911,431 | 6/1999 | Brown et al. | 280/642 |
| 5,988,669 | 11/1999 | Freese et al. | 280/642 |

* cited by examiner

*Primary Examiner*—Michael Mar
(74) *Attorney, Agent, or Firm*—Foley & Lardner

(57) ABSTRACT

A stroller has a collapsible frame, a removable stand, a removable footrest assembly, removable front and upper trays, and a latch for maintaining the collapsible frame in the collapsed position. The stand is connected to the cross brace and the intermediate bar of the frame, and movable between an extended position when the stroller frame is in the collapsed position and a retracted position when the stroller frame is in the operating position. The stand includes a stand guide and an elongated member movable relative to the stand guide. The elongated member has a first C-shaped collar at one end thereof and a foot at the opposite end. The foot can engage the ground or support when the stand is moved to the extended position to keep the collapsed stroller in an upright position. The stand guide has a second C-shaped collar. The first collar is pivotally and removably connected to an intermediate bar of the seat support, and the second collar is pivotally and removably connected to a rear cross brace connecting the rear right and left legs of the collapsible frame. The footrest assembly is attached to a front cross brace connecting the front right and left legs of the collapsible frame.

24 Claims, 13 Drawing Sheets

STROLLER AND COMPONENTS THEREOF

BACKGROUND

U.S. Pat. Nos. 5,454,584 and 5,605,409 issued to Haut et al., each disclose a collapsible stroller having an λ-shaped frame (hereafter "A-shaped frame"), collapsible between an operating position and a collapsed position. The disclosures of these patents are incorporated herein by reference. Such a collapsible stroller includes soft goods made of fabric, such as a seat, back support, canopy, storage basket, etc., covering parts of the stroller frame. The back support is movably configured between a sitting position and a recumbent or lying position. This stroller may be folded regardless of where the back support is positioned. This stroller also has a latch that automatically locks the stroller in the collapsed position to prevent the stroller from unfolding during handling, and has hinge locks that lock the stroller in the operating position. Further, this stroller has ergonomically correct gripping portions to allow the user to travel extended distances more comfortably.

In A-shaped frame strollers, or any other collapsible frame type strollers, when the stroller is in the collapsed position, the stroller is not sufficiently stable to position it upright. Therefore, the stroller has to be laid down flat on the ground or leaned against a support, making it more cumbersome to handle. It would be desirable to provide a stroller that can stand upright when the stroller is collapsed. U.S. Pat. No. 5,725,238 issued to Huang discloses a U-shaped stand pivotally connected to the U-shaped seat or basket frame of the stroller frame. The stand, however, extends outwardly when the stroller is collapsed, taking up space. As the stand is fixedly connected to the stroller frame, it cannot be disabled, unless the wheels are taken off

SUMMARY

The present invention relates to a stroller having a stroller frame, which can be collapsible, and the components thereof. In particular, in one aspect of the invention, the stroller has a stand. In another aspect of the invention, the stroller has a removable footrest assembly. In yet another aspect of the invention, the stroller has removable trays.

The stroller can comprise a collapsible frame, a stand, a removable footrest assembly, a removable front tray, a removable upper tray, and a latch, or any combination thereof.

The collapsible frame comprises at least the handle frame and front right, front left, rear right, and rear left legs pivotally connected to the handle frame. The collapsible frame can further include a seat frame having an intermediate bar and right and left arms extending from the intermediate bar. The right arm can be pivotally connected to the front and rear right legs and the left arm can be pivotally connected to the front and rear left legs. It can further include one or more front cross braces connecting the front right and left legs and a rear cross brace connecting the rear right and left legs. The collapsible frame is movable between a collapsed position and an operating position.

The stand can be connected to the cross brace and the intermediate bar, and the stand is movable between an extended position when the collapsible frame is in the collapsed position and a retracted position when the collapsible frame is in the operating position. The stand includes a stand guide and an elongated member movable relative to the stand guide. The elongated member has a first connector at one end thereof and a foot at the opposite end. The foot can engage the ground or support when the stand is moved to the extended position to keep the collapsed stroller in an upright position. The stand guide can have a second connector. One of the first and second connectors can be connected to the intermediate bar and the other of the first and second connectors can be connected to the rear cross brace.

The first connector can be connected to the intermediate bar and the second connector to the cross brace. Specifically, the first connector can be pivotally and removably connected the intermediate bar and the second connector can be pivotally and removably connected to the cross brace. In this respect, the first and second connectors each can comprise a C-shaped collar.

The elongated member can have an opposing pair of flanges and a slot formed therebetween. The stand guide has opposing grooves that engage the flanges so that the elongated member is slideably movable relative to the stand guide. The slot has a wider portion adjacent the first connector. The wider slot portion is dimensioned to allow insertion and removal of the stand guide. The wider slot portion can have a keyhole and the stand guide can have a complementary projection to allow insertion of the stand guide in a particular direction.

The stroller can include a latch that automatically latches the handle frame to one of the rear right and left legs upon the stroller frame being moved to the collapsed position. The latch can comprise a flat resilient member having a slot attached to one of the handle frame and the rear right or left leg, and a pin extending from the other of the handle frame and the rear right or left leg. The pin engages the slot to prevent the stroller frame from moving to the operating position.

The trays can include an upper tray removably connected to the handle frame and a front tray removably connected to the front right and left legs.

The stroller can include a footrest assembly removably attached to the stroller frame to cover the front right and left legs. The footrest assembly can have a foot resting portion, a substantially upright rear support, and right and left front leg shields. The foot resting portion can be positioned between the front right and left legs, and the substantially upright rear support can extend contiguously and upwardly, angled from the foot resting portion. The right and left front leg shields can extend along and over the front right and left legs respectively. The footrest assembly can have a first footrest connector, such as a C-shaped collar, that detachably secures the footrest assembly to the front cross brace connecting the front legs. The footrest assembly can also have a second footrest connector that secures the footrest assembly to the collapsible frame. To accomplish this connection, the collapsible frame can have a first spacer, positioned between the right seat frame arm and the front right leg, and a second spacer, positioned between the left seat frame arm and the front left leg, the second footrest connector in turn can comprise a first cutout in the right front leg shield dimensioned to connect to the first spacer and a second cutout in the left front leg shield dimensioned to connect to the second spacer. The footrest assembly can further include one or more cross braces connecting the right and left leg shields.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

Although references are made here to directions in describing the structure, they are made relative to the drawings (as normally viewed) for convenience. The directions, such as left, right, upper, lower, inward, outward, etc., are not intended to be taken literally or limit the present invention in any form. Moreover, the numerical nomenclatures, first, second, third, fourth, etc., are used solely for purposes of tracking the structural elements. These numerical nomenclatures are not intended to be taken literally or to limit their associated elements.

Figure 1:
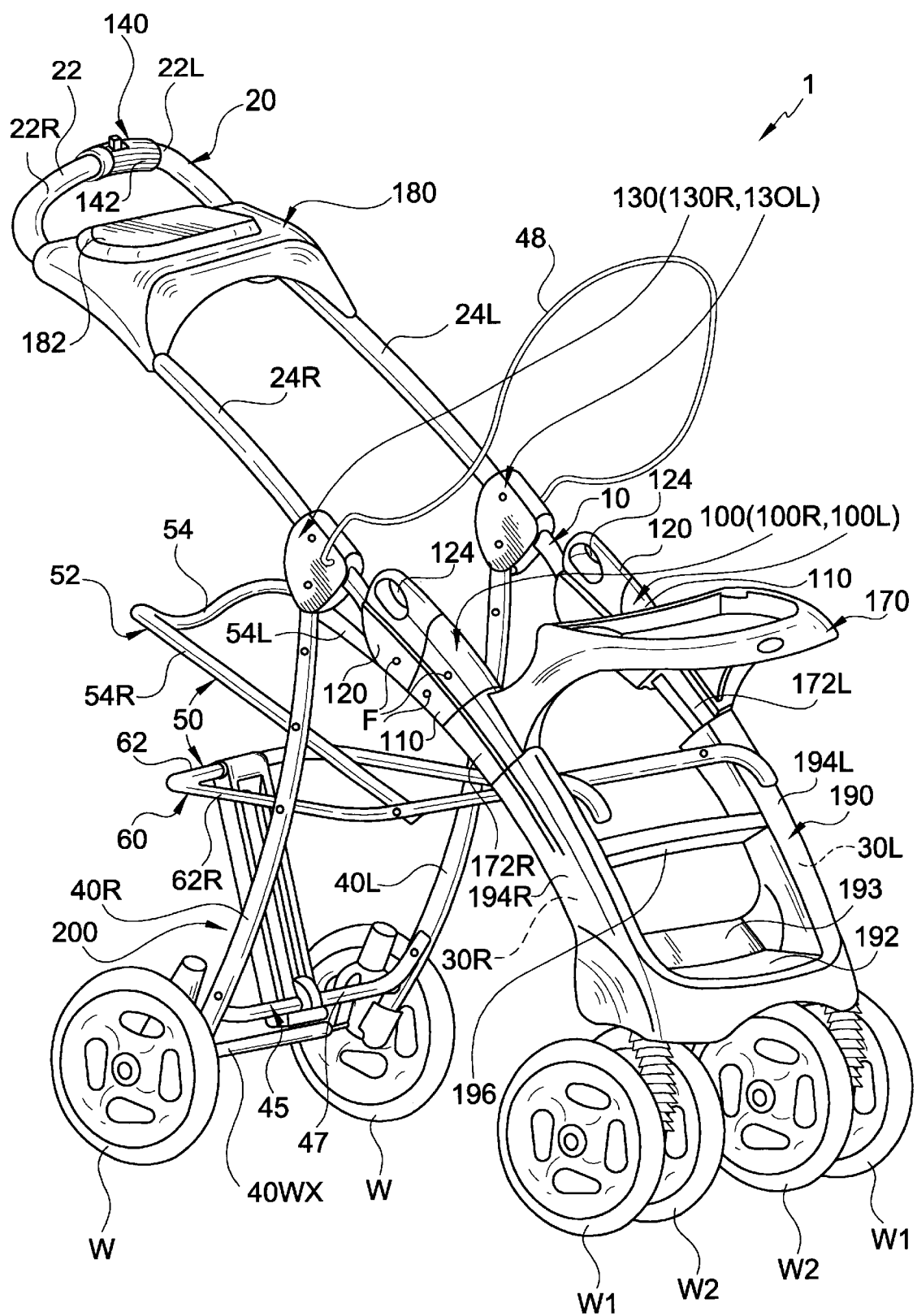
FIG. 1 is a perspective view a collapsible stroller (in the operating position) with a stand.

FIG. 1 shows the perspective view of a collapsible stroller 1 that can be used to transport a passenger. The stroller is shown without the associated "soft goods," such the seat, the back support, the canopy, the basket, etc., which are typically made of cloth or plastic or both, or a flexible material, to more clearly illustrate the stroller frame 10. The stroller 1 is generally intended for transporting children, but the inventive principles can be applied to all types of wheeled transports, including carts having a collapsible frame.

Figure 2:
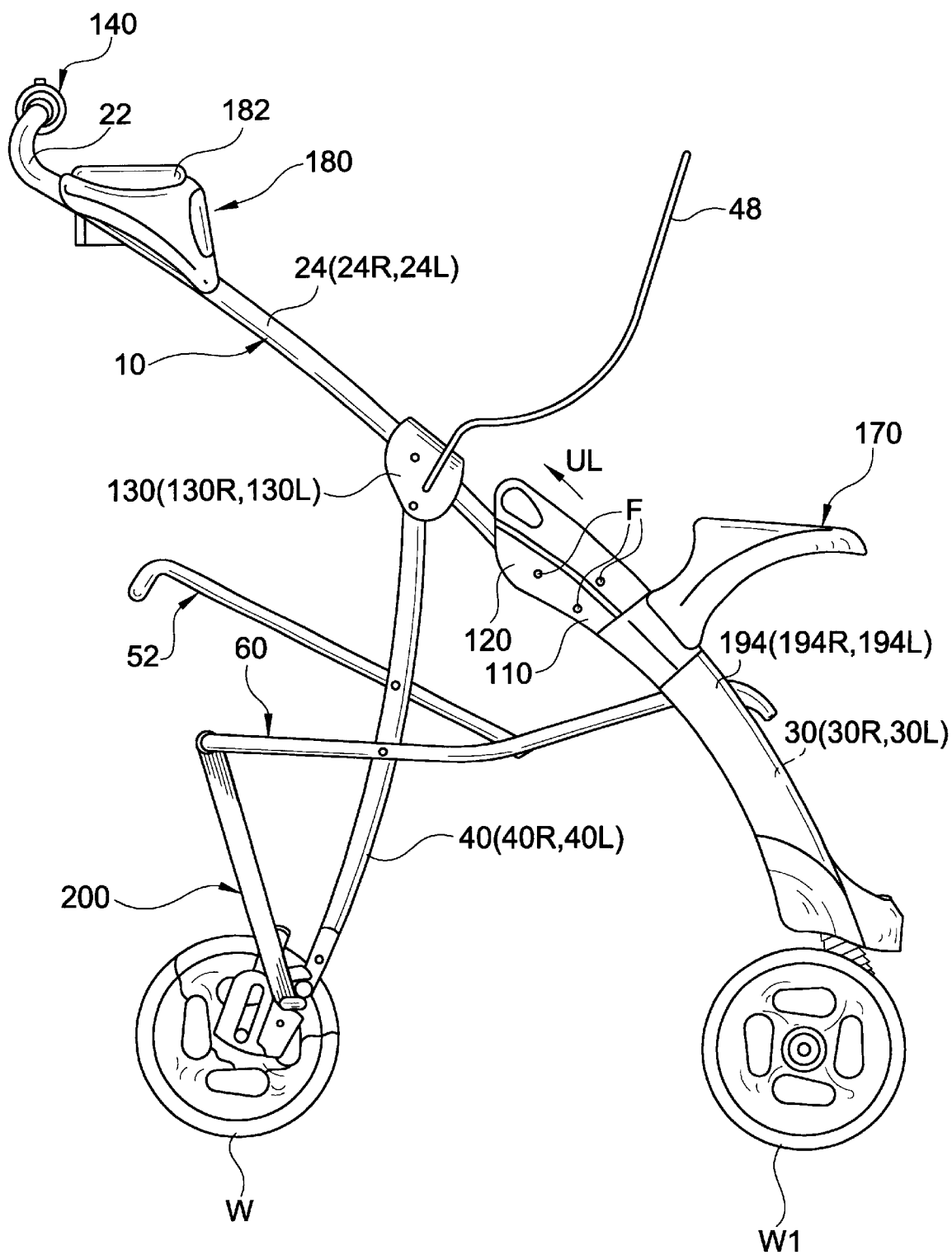
FIG. 2 is a side view a collapsible stroller of FIG. 1 with the rear right wheel removed to better illustrate the stand.
Figure 5:
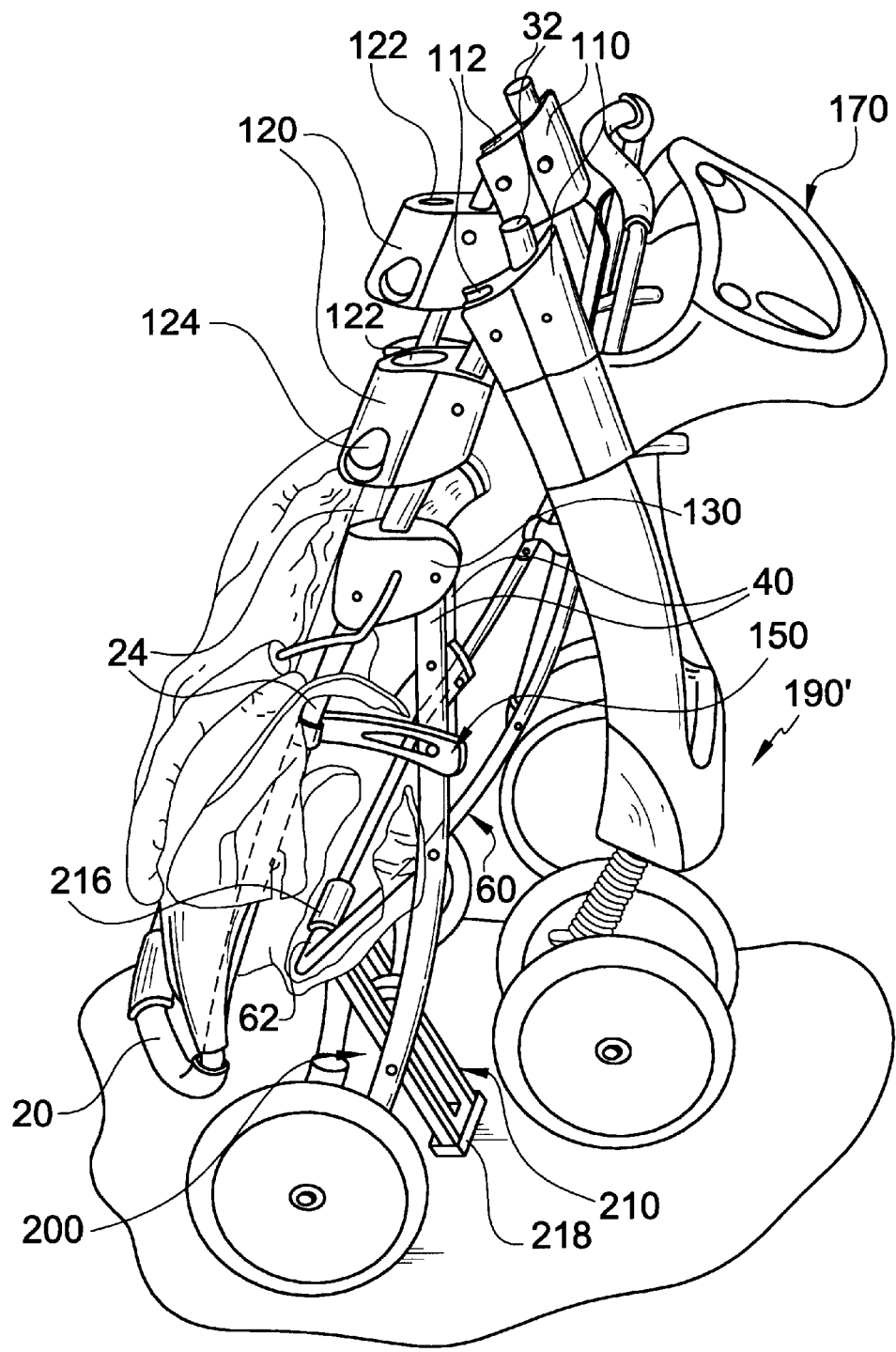
FIG. 5 is a perspective view of the stroller in the collapsed position, with the stand supporting the collapsed stroller in the upright position.

The stroller 1 includes a stroller frame 10 that is convertible between an operating or use position, as shown in FIGS. 1 and 2, and a collapsed or stowed position, as shown in FIG. 5. In the collapsed position, the stroller 1 is folded to a generally flattened configuration for storage. In the operating position, the stroller 1 is configured to receive and transport a passenger in a manner well understood by those skilled in the art.

Referring to FIGS. 1 and 2, the stroller frame 10 can have the basic A-frame structure as described in U.S. Pat. Nos. 5,454,584 and 5,605,409, the disclosures of which are incorporated herein by reference. The stroller frame 10 typically includes a handle frame 20, legs 30R, 30L, 40R, 40L, and a passenger support or frame 50.

The handle frame 20 comprises a gripping portion 22 and right and left push bars or arms 24R, 24L extending from the gripping portion 22. The gripping portion 22 and the right and left arms 24R, 24L form a generally U-shaped frame. As better shown in FIGS. 2 and 4, the gripping portion 22 includes a right area 22R for receiving a right hand of a user (not shown) and a left area 22L for receiving a left hand of the user (not shown). The right and left areas 22R, 22L extend at an angle of less than one hundred eighty degrees with respect to each other, as described in aforementioned U.S. Pat. Nos. 5,454,584 and 5,605,409, the disclosures of which are incorporated herein by reference. This provides the gripping portion 22 with an ergonomically correct design, which enables the user to push the stroller 10 more comfortably.

The legs 30R, 30L, 40R, 40L can be described in terms of front legs 30, which include a front right (FR) leg 30R and a front left (FL) leg 30L (see FIG. 7), and rear legs 40, which include a rear right (RR) leg 40R and a rear left (RL) leg 40L. Each leg 30R, 30L, 40R, 40L has a lower end to which at least one rotatable wheel W is mounted. As shown, the front legs 30 each can have a pair of rotatable wheels W1, W2. The rear legs 40R, 40L are reinforced with a cross brace 45. The cross brace 45 has a horizontal member 47 extending between the rear wheels W, W, and above the rear wheel axle 40WX.

The front and rear legs 30R, 30L, 40R, 40L are pivotally mounted to the handle frame 20. Specifically, a first pair of hinges 100, including a first right hinge 100R and a first left hinge 100L, connect the handle frame 20 to the front legs 30. A second pair of hinges 130, including a second right hinge 130R and a second left hinge 130L, connect the handle frame 20 to the rear legs 40. The first and second pair of hinges 100, 130 pivotally mount the front and rear legs to the handle frame so that the stroller frame can be folded between the collapsed and operating positions, substantially as described in aforementioned U.S. Pat. Nos. 5,454,584 and 5,605,409.

Referring to FIGS. 2 and 5, the first hinges 100R, 100L each comprise a lower body 110 and an upper body 120. The upper body 120 locks the stroller in the operating position. The lower body 110 has an aperture or passage for receiving an upper end portion of the respective front leg 30R, 30L. The front leg 30R, 30L is fixed to the lower body 110 with a fastener F, such as a pin, rivet, bolt, screw, etc. A front leg upper end 32 protrudes beyond the lower body 110. The lower body 110 further includes a cavity 112 that receives a lower end portion of the arm 24R, 24L and allows the arm 24R, 24L to pivot relative to the lower body 110. That is, the lower end portion 26 is pivotally mounted to the lower body 110 so that the arm 24R, 24L can be pivotally moved relative to the respective front leg 30R, 30L.

The upper body 120 is slideably disposed on the lower end portion of the arm 24R, 24L. In this respect, the upper body 120 has an elongated hole or recess that receives the arm 24R, 24L. The lower end portion 26 of each arm 24R, 24L has an elongated slot (not shown). A fastener F, such as a pin or rivet, extends through the slot and is fixed to the upper body 120. This configuration allows the upper body 120 to slide along the respective arm 24R, 24L, the amount of sliding movement being determined by the slot length. The upper body 120 further has an aperture 122 that can receive and hold the upper end 32 of the front leg 30R, 30L. A spring or the like (not shown) can be used to bias the upper body 120 toward the lower body 110, as described in U.S. Pat. Nos. 5,454,584 and 5,605,409, the disclosures of which are incorporated herein by reference.

To unlock the stroller frame 10 from the operating position to the collapsed position, the operator can pull both the upper bodies 120 of the first hinges 100R, 100L. Each upper body 120 has a finger receiving portion 124. The operator can insert his or her finger(s) in the finger receiving portion 124 and slide the upper bodies 120 along the arms 24R, 24L in the direction of arrow UL (see FIG. 2) until each upper body 120 clears the associated front leg end 32. Once the upper bodies 120 clear the front leg ends 32, the arms 24R, 24L can pivot relative to the front legs 30R, 30L to assume the collapsed position. The operating position is resumed by inserting the front leg ends 32 in the upper bodies 120, whereupon the arms 24R, 24L and front legs 30R, 30L are locked to each other.

The stroller also can include a one hand release mechanism 140 as described in U.S. patent application Ser. No. 08/912,131, the disclosure of which is incorporated herein by reference. Instead of pulling the upper bodies 120 associated with the front legs 30R, 30L with both hands, the one hand release mechanism is operatively connected to the upper bodies 120 to move both the upper bodies 120 away from their associated lower bodies 110 with one hand by rotating the one-hand handle 142.

The second hinges 130R, 130L each comprise a body 130 fixedly secured to the arm 24R, 24L, above the first hinge 100R, 100L. An upper end portion of the rear leg 40R, 40L is pivotally mounted to the body 130 so that the respective rear leg 40R, 40L can pivot relative to the respective arm 24R, 24L.

A canopy support rod 48 is pivotally mounted to the second hinges 130R, 130L to permit the canopy (see FIG. 4) to be moved between a position where it extends outwardly from the handle arms 24R, 24L to shade the passenger and a position where it is pulled against handle arms 24R, 24L.

The passenger support 50 includes a substantially U-shaped back support frame 52 and a substantially U-shaped seat support frame 60. The back support frame 52 includes an intermediate bar 54 joined to right and left arms 54R, 54L. The seat support frame 60 likewise has an intermediate bar 62 joined to right and left arms 62R, 62L. The seat support frame arms 62R, 62L are pivotally mounted to the respective front and rear legs 30R, 40R, 30L, 40L. The back support frame arms 54R, 54L are pivotally mounted to the seat support frame arms 62R, 62L, and can have an automatic reclining latch (not shown) as described in the aforementioned U.S. Pat. Nos. 5,454,584 and 5,605,409, the disclosures of which are incorporated herein by reference. The back support frame 52 is typically adjustable between at least two positions, reclined (recumbent or lying) and upright (sitting) in the operating position. When the stroller is in the collapsed position, the back support frame 52 is reclined in a recumbent or lying position. The automatic latch (not shown) allows the back support frame 52 to move automatically, from the upright position to the recumbent position when the stroller is being collapsed, as disclosed in the aforementioned patents. A storage basket or the like (not shown) can hang from the seat support frame 60 to provide a storage area. The seat support frame arms 62R, 62L protrude beyond the front legs 30R, 30L, as shown in FIG. 2.

Figure 6:
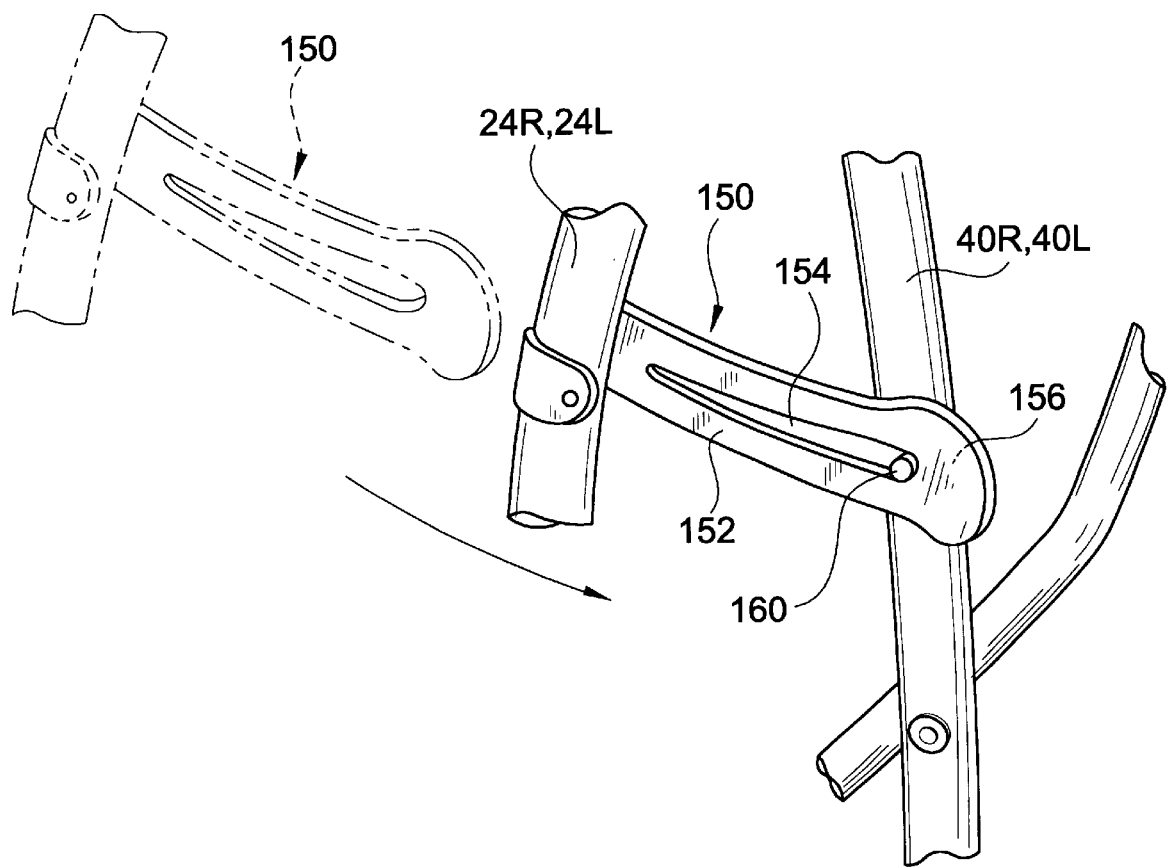
FIG. 6 illustrates the automatic latch that maintains the stroller in the collapsed position.

Referring to FIGS. 5 and 6, the stroller frame 10 can further include a latch 150 that releasably and automatically locks the frame 10 in the collapsed position. The latch 150 can be connected to either the right arm 24R or the left arm 24L. The latch 150 comprises a generally resilient member 152 having a slot 154 and a cam portion 156. In the embodiment illustrated, the latch 150 is attached to the right arm 24R. The resilient member 152 extends outwardly generally in the same plane as the plane intersecting the right arm 24R and the rear right leg 40R. The latch 150 further includes a pin 160 or pin-like member attached to the rear right leg 40R and positioned to intercept the resilient member 152. The position of these elements can be reversed, i.e., the pin 160 positioned in the right arm 24R and the resilient member 152 connected to the rear right leg 40R. The cam portion 156 is adapted to slide over the pin 160 into the slot 154, as the stroller frame 10 is moved to the collapsed position, and position the pin within the slot 154. As the slot 154 confines the pin 160, it will prevent the arm 24R, 24L from moving away from the rear leg 40R, 40L. The resilient member 152 can be biased to keep the pin 160 engaged to the slot 154. The latch 150 can automatically lock the frame 10 in the collapsed position when the frame 12 is collapsed. To release the latch 150, the user lifts the flexible member 152 to clear the pin 160 from the slot 154 while the handle frame is rotated out to the operating position.

While the latch 150 is illustrated as latching the right arm 24R to the rear right leg 40R, the latch 150 can be positioned to latch the handle frame 20 to the front leg frame 30R, 30L, or any other parts of the frame that move relative to other parts when the frame is collapsed.

The stroller 1 can further include a front tray 170 and an upper tray 180. The front tray 170 can be removably attached to the front legs 30R, 30L. The front tray has connectors 172R, 172L that are configured to abut against and extend contiguously from the hinge lower body 110 to provide a streamlined and aesthetically pleasing appearance. The connectors 172R, 172L each can have a substantially C-shaped inboard wall portion or collar that can be elastically deformed to provide a snap fit with the front legs 30R, 30L. The connectors 172R, 172L can be biased with the opening slots of the C-shaped collar facing toward each other.

Figure 8:
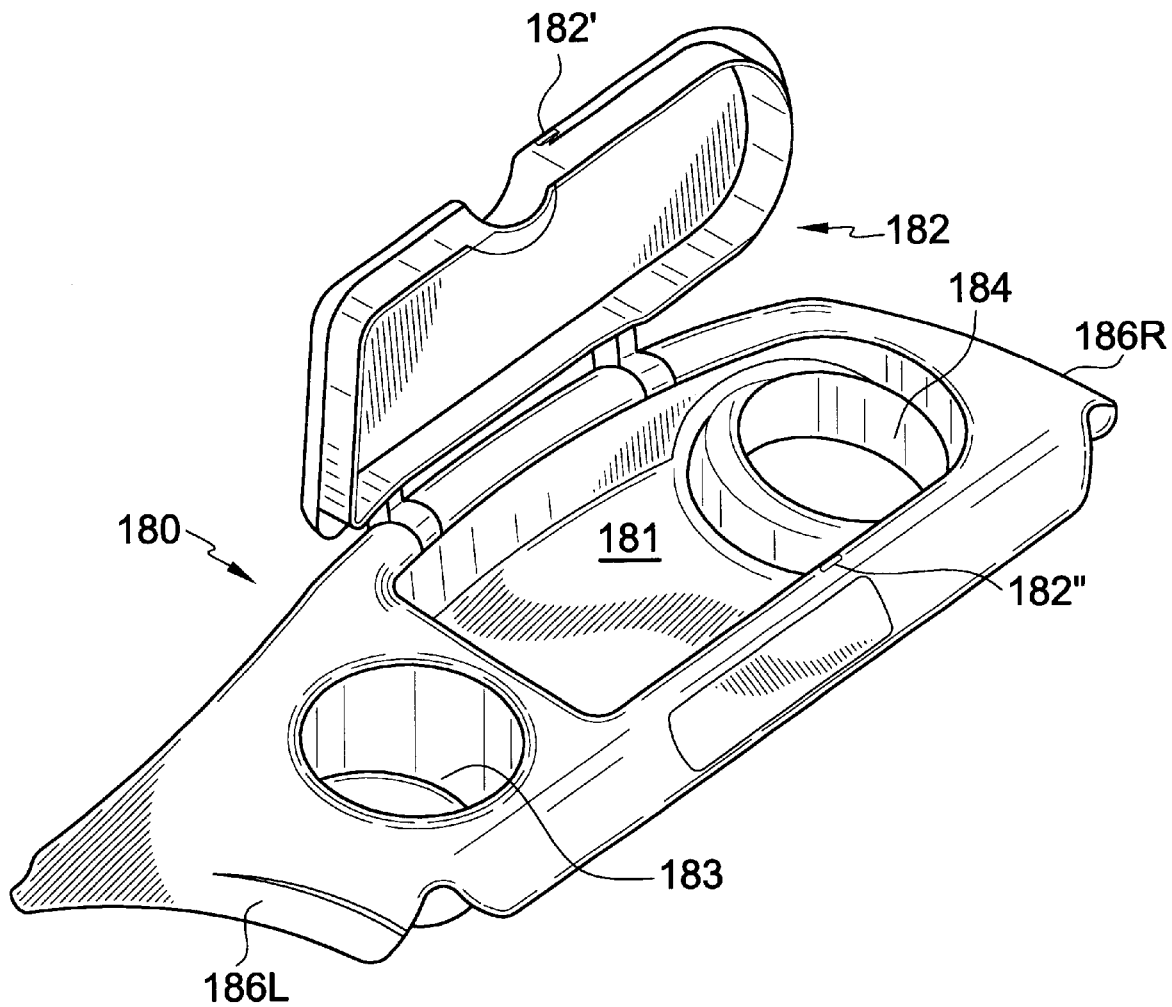
FIG. 8 is a detailed perspective view of the upper tray with its lid open.

The upper tray 180 can have a removable and/or open and closable lid 182, as more clearly shown in FIG. 8. The upper tray 180 further can have a recessed storage compartment 181 and one or more cup or container-holding recesses 183, 184. The second cup-holding recess 184 can be formed within the storage compartment 181. The lid 182 can close the storage compartment, including the second cup-holding recess 184. In this respect, the lid 182 can include a latch 182' cooperating with a complementary recess 182" formed in the upper tray 180 to maintain the lid 182 in the closed position.

Figure 9:
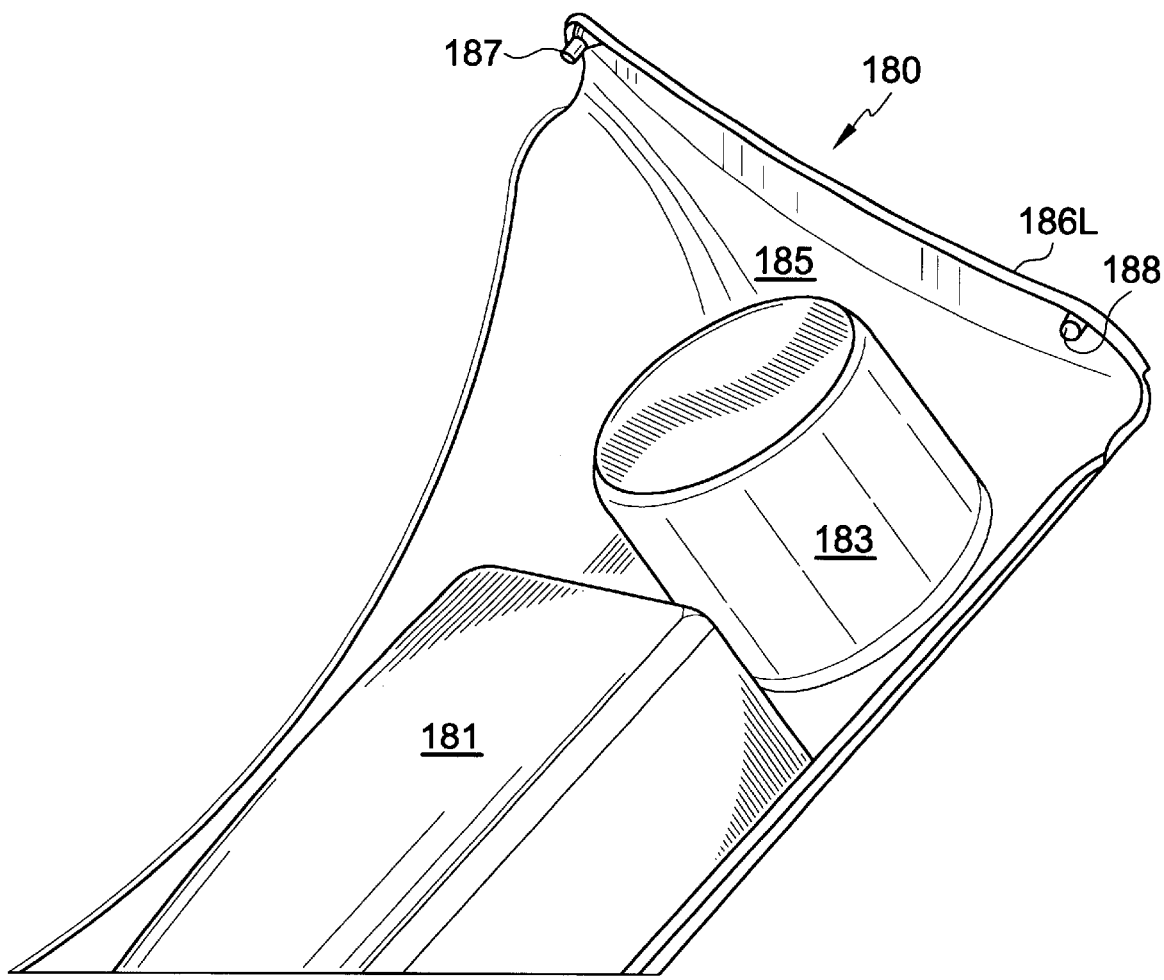
FIG. 9 is a partial bottom perspective view of the upper tray of FIG. 8, illustrating the connector.

Referring to FIG. 9, the upper tray 180 is adapted to be removably connected to the stroller handle frame 20. The upper tray 180 has opposing side skirts 186 (186R, 186L) that respectively slips over the right and left handle arms 24R, 24L. The underside walls 185 adjacent the side skirts 186R, 186L can be contoured complementary to the curvature of the right and left handle arms 24R, 24L so that the underside walls 185 can sit on the top of the handle arms 24R, 24L. Each side skirt 186R, 186L has first and second protrusions 187, 188, each adapted to project into a hole or recess in the respective handle arm 24R, 24L. The first protrusion 187 can be a pin or the like, and the second protrusion 188 can be a bump or the like. The second protrusion 188 can engage a complementary dimple or indent formed in the respective handle arm 24R, 24L, or it can plainly engage the side of or slightly below the widest portion of the respective handle arm 24R, 24L so that the upper tray 180 is frictionally engaged to the handle arms 24R, 24L. The first protrusion 187 is sufficiently deep to lock the upper tray 180.

To attach the upper tray 180, one of the first projections 187 is inserted into a complementary hole on the handle arm 24R, 24L, and the other of the first projections 187 is inserted into a complementary hole on the other handle arm 24L, 24R. The upper tray is pivotal about the first projections 187. The upper end of the tray 180 is pivoted down so that the underside walls 185 sit on the top of the handle arms 24R, 24L. The second projections 188 can engage complementary recesses in the handle arms 24R, 24L to prevent the tray 180 from moving.

To remove the upper tray 180, the upper end of the tray 180 is lifted away from the handle arms 24R, 24L so that the second projections 188 slip out of the recesses formed in the handle arms 24R, 24L. The first projections can be pulled out one at a time by pulling the respective side skirt 186R, 186L outwardly.

Figure 7:
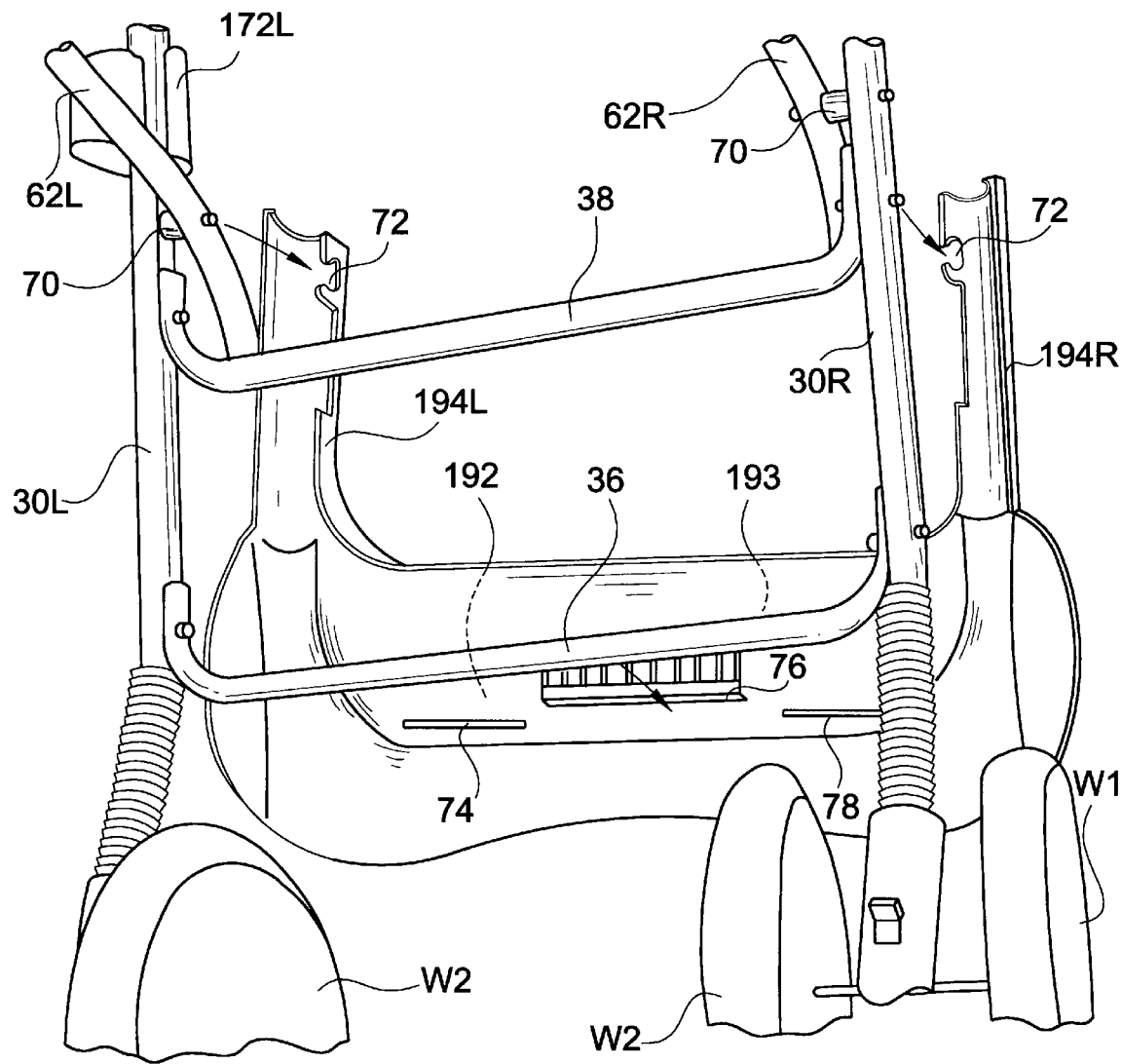
FIG. 7 illustrates another embodiment of a footrest assembly, similar to the one shown in FIG. 1, but without the footrest cross brace, and the manner in which the footrest assembly can be removably attachable to the stroller frame.

The stroller 1 further includes a footrest assembly 190 (FIG. 1) or 190' (FIG. 7) that can be removably attached to the front legs 30R, 30L, proximate to the front wheels W1, W2. Referring to FIG. 7, the stroller frame 10 can further include one or more cross braces 36, 38 connecting and bracing the front legs 30R, 30L. The footrest assembly 190, 190' includes a substantially horizontal foot resting portion 192 positioned above the inner right and left front wheels W2, W2. The footrest assembly 190, 190' further includes a substantially upright rear support 193 extending horizontally contiguously and upwardly, angled from the foot resting portion 192. The footrest assembly 190, 190' further includes right and left front leg shields 194R, 194L extending along and over the front legs 30R, 30L.

The leg shields 194R, 194L are designed to hide or cover the front legs 30R, 30L, which are typically made of metal tubing. In this respect, the leg shields 194R, 194L can be shaped as desired. In the embodiments shown, the leg shields are streamlined to give an aesthetically pleasing appearance. The hinges 100R, 100L and the front tray connectors 172R, 172L, and the leg shields 194R, 194L all can be streamlined to give an even more aesthetically pleasing appearance. The footrest assembly 190 can further include a cross brace 196 connecting the leg shields 194R, 194L to add strength, as shown in FIG. 1. In the embodiment of FIG. 1, the upper frame cross brace 38 can be eliminated. FIG. 7 shows an embodiment of footrest assembly 190' without the cross brace 196, and the stroller frame with two cross braces 36, 38.

More clearly shown in FIG. 7, the seat frame arms 62R, 62L each are pivotally mounted respectively to the front legs 30R, 30L with a spacer 70 therebetween. The leg shields 194R, 194L each have a cutout 72 that is configured to receive the spacer 70. The cutouts 72 preferably latch into place around the spacers 70 to connect the footrest assembly to the stroller frame. The cutouts 72 can be C-shaped for snap fit attachment with the spacers 70. Underneath the foot resting portion 192, there are three or more ribs 74, 76, 78 extending below the foot resting portion 192 for securing the footrest assembly to the front lower cross brace 36. These ribs 74, 76, and 76 assist and supplement the cutouts 72 in connecting the footrest assembly to the stroller frame. The two outer front ribs 74 and 78 are laterally spaced apart in the same plane. The middle rib 76 is positioned between the ribs 74 and 78, but in a different plane, positioned rearwardly from the outer ribs 74, 78. The outer front ribs 74 and 78 and the rear middle rib 76 can snap onto the front lower cross brace 36. The spacing between the outer front ribs 74 and 78 and the rear middle rib 76 can be slightly smaller than the diameter of the front lower cross brace 36 so that the ribs 74, 76, 78 can be held connected to the cross brace 36.

Figure 10:
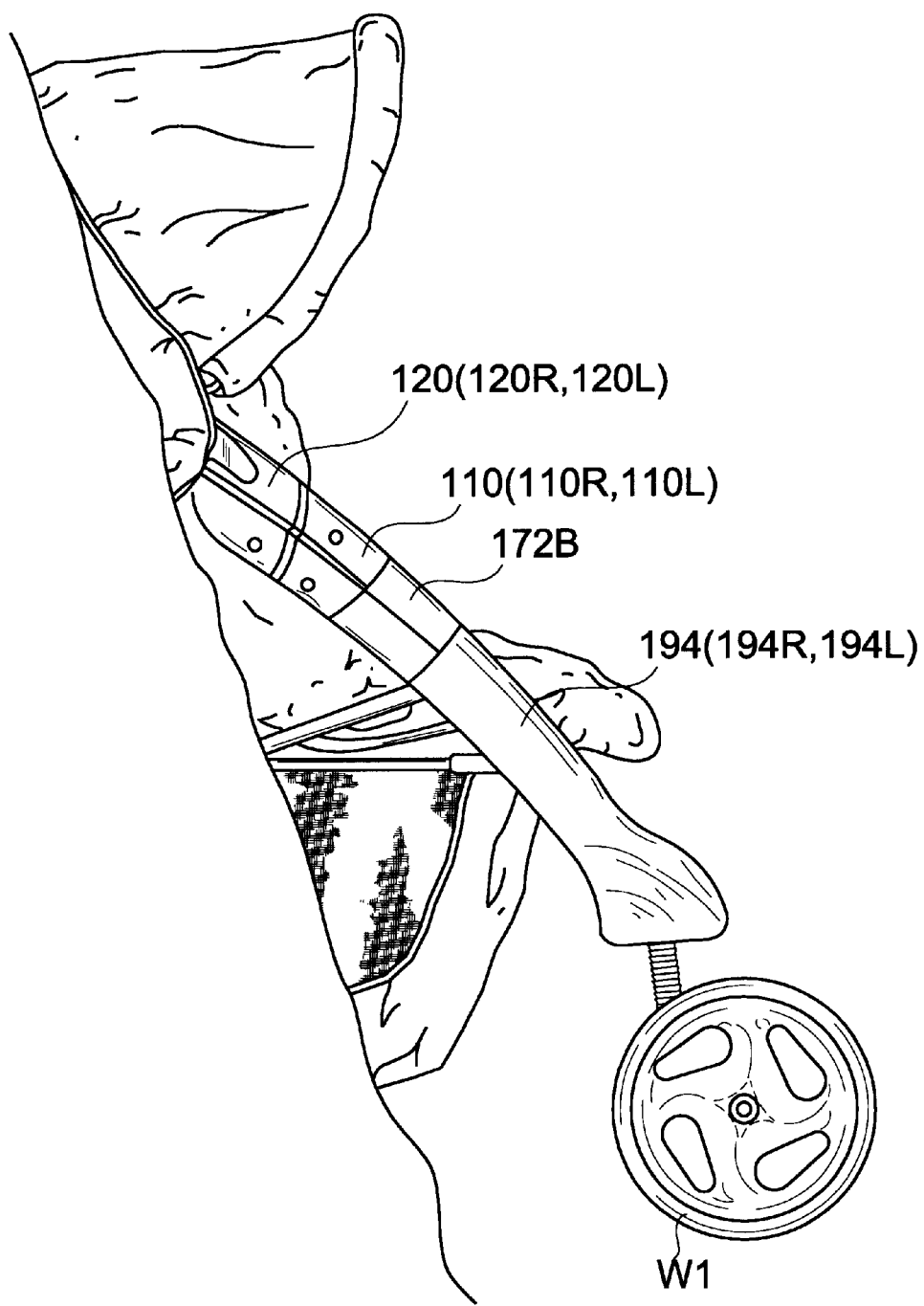
FIG. 10 is a partial side view of a stroller showing the filler block.

The front tray 170, the upper tray 180, and the footrest assembly 190, 190' can all be made of plastics, such as polypropylene, nylon, etc. If the front tray is removed, the gap between the hinge lower body 110 and the upper end of the leg shield 194R, 194L can be filled in with filler blocks 172B to provide a similar streamlined appearance. See FIG. 10.

The stroller 1 can also include a stand 200 that enables the stroller to maintain the upright position, as shown in FIG. 5. This way, the stroller can be more easily manipulated, as the user does not need to bend down to retrieve the stroller 1. Referring to FIGS. 3, 3A, 3B, 4, and 5, the stand 200 can comprise a beam member 210 and a guide 220. The beam member 210 can be I-shaped, as better shown in FIG. 3A. The beam member 210 has an elongated beam 212, a connector 216 at one end thereof and a foot 218 at the opposite end thereof. The elongated beam 212 has a central slot 214 extending substantially the full length thereof.

Figure 3:
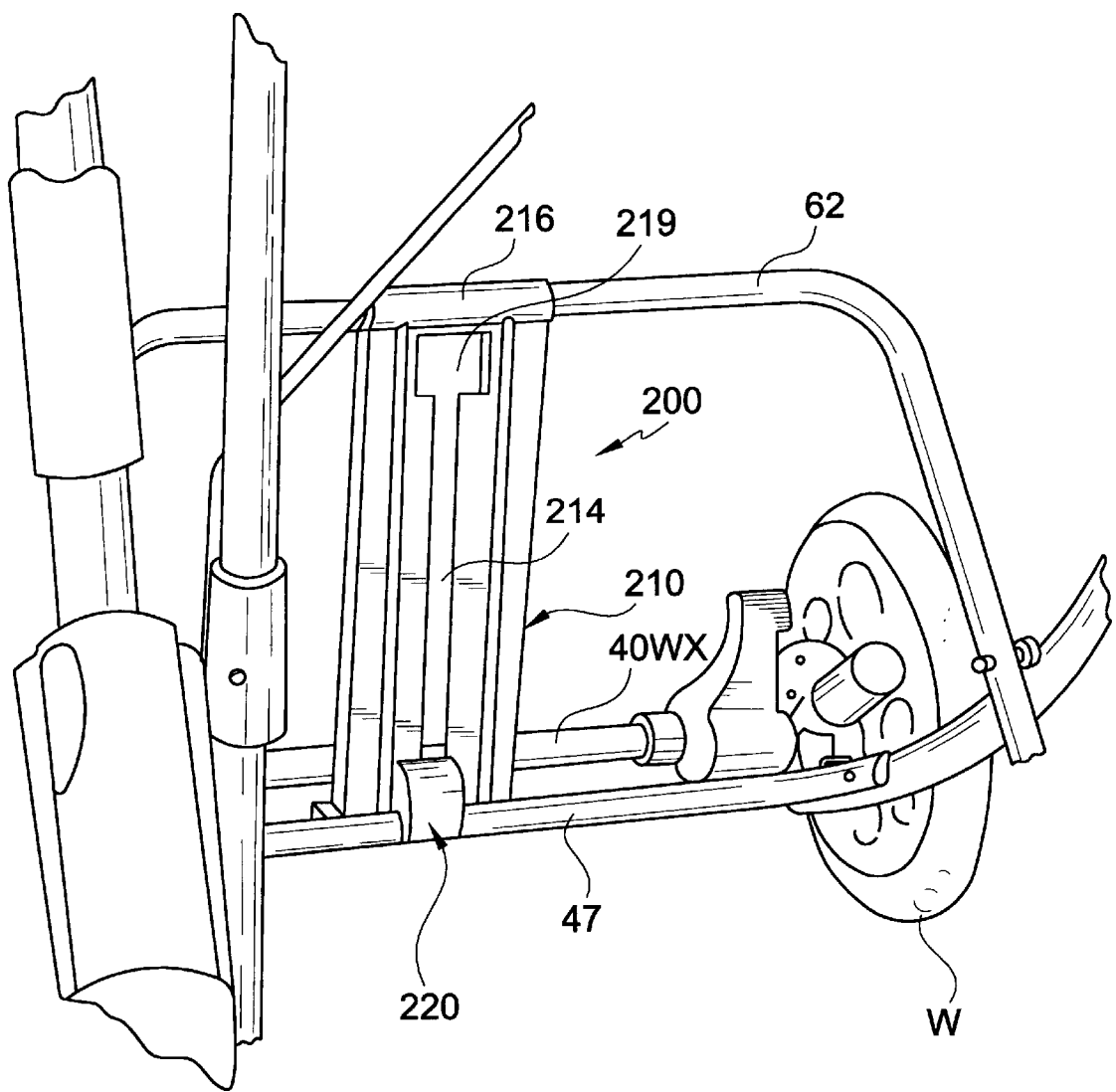
FIG. 3 is another perspective view of the stand of FIG. 1.
Figure 3A:
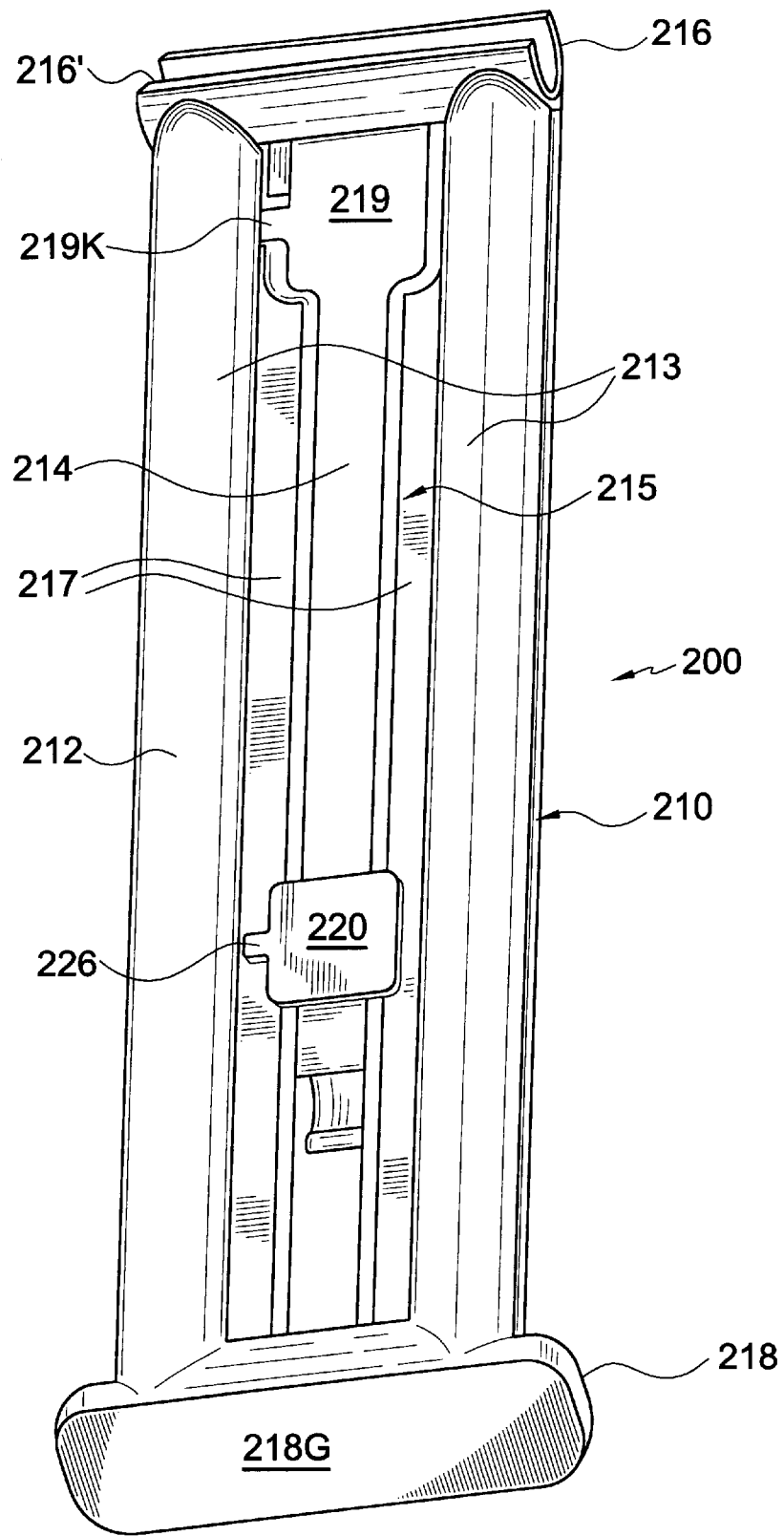
FIG. 3A is a detailed perspective view of the stand of FIG. 1.

Referring to FIG. 3A and FIG. 5, the foot 218 is adapted to engage the ground or support. In this respect, the ground engaging portion 218G of the foot 218 can include an anti-skid pad or material. The foot 218 also can be made to pivot relative to the elongated beam 212, via, for example, a universal joint, so that the foot can engage the ground more solidly, particularly when the ground is not level.

Referring to FIG. 3A, the connector 216 can comprise a C-shaped collar or the like, where it has an opening slot or mouth 216' slightly smaller than the diameter of a tubular member to which the connection is being made. The connector 216 can expand when pressure is applied to allow passage of the tubular member. The connector 216 in this embodiment is dimensioned to pivotally engage the intermediate bar 62 of the seat frame 60. The connector 216 can be made to snap fit, while permitting the elongated member 210 to pivot relative to the intermediate bar 62. When a predetermined amount of force is applied to the stand 200, the connector 216 can release from the intermediate bar 62.

Figure 3B:
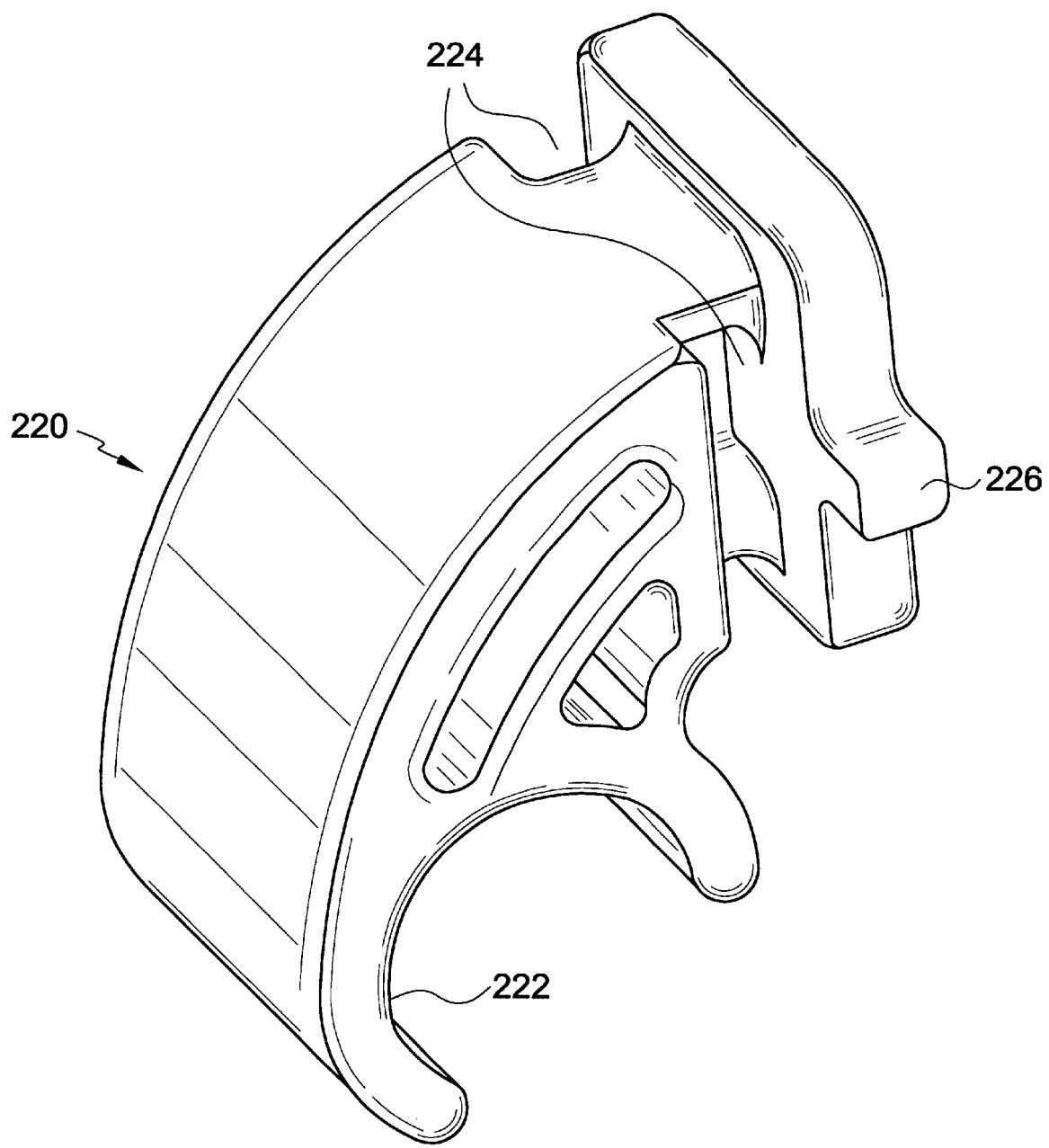
FIG. 3B is a detailed perspective view of the stand guide of FIG. 1.

Referring to FIG. 3B, the stand guide 220 is slideably mounted to the beam member 210. The stand guide 220 also has a connector 222, which can also have a C-shaped collar, similar the beam member connector 216. The connector 222 in this embodiment is dimensioned to pivotally engage the cross brace 45 connecting the rear legs 40R, 40L near the rear wheels W, W. The connector 222 likewise is adapted to be disconnected when a predetermined force is applied thereto, while permitting it to pivot relative to the cross brace 45. The stand guide 220 has a pair of opposing grooves 224 that are guided in the slot 214. Specifically, the elongated beam 212 can have opposed side portions 213 having a thicker dimension to provide suitable rigidity and strength. The portion 215 extending between the thicker side portions 213 can be made substantially flat, and substantially thinner than the side portions 213. The slot 214 is formed in the thinner central portion 215. Running longitudinally along the opposing longitudinal edges of the slot 214 are a pair of flanges 217 formed by the thinner central portion 215. Adjacent the connector 216, the slot 214 becomes larger. This larger upper slot 219 is dimensioned larger than the width of the stand guide 220 to allow insertion. The stand guide opposing grooves 224 and the opposing flanges 217 are dimensioned to allow the stand guide to move (slide) 220 longitudinally along the slot 214 and maintain connection. So that the stand guide 220 is inserted correctly, one side thereof has a tab or protrusion 226 that fits into a keyhole 219K formed on one side of the larger slot 219. The stand can be made from plastics such as polypropylene, nylon, and ABS.

In operation, the stand guide connector 222 is snapped onto the cross brace 45 extending between the rear legs 40R, 40L. The stand guide 220 is inserted through the larger slot 219 formed adjacent the connector 216. The elongated member 210 is slid relative to the stand guide so that the grooves 224 guide the flanges 217. The elongated member 210 is slid along the stand guide 220 toward the seat frame 60. The connector 216 is snapped onto the intermediate bar 62. The stand 200 is now ready for operation.

Figure 3C:
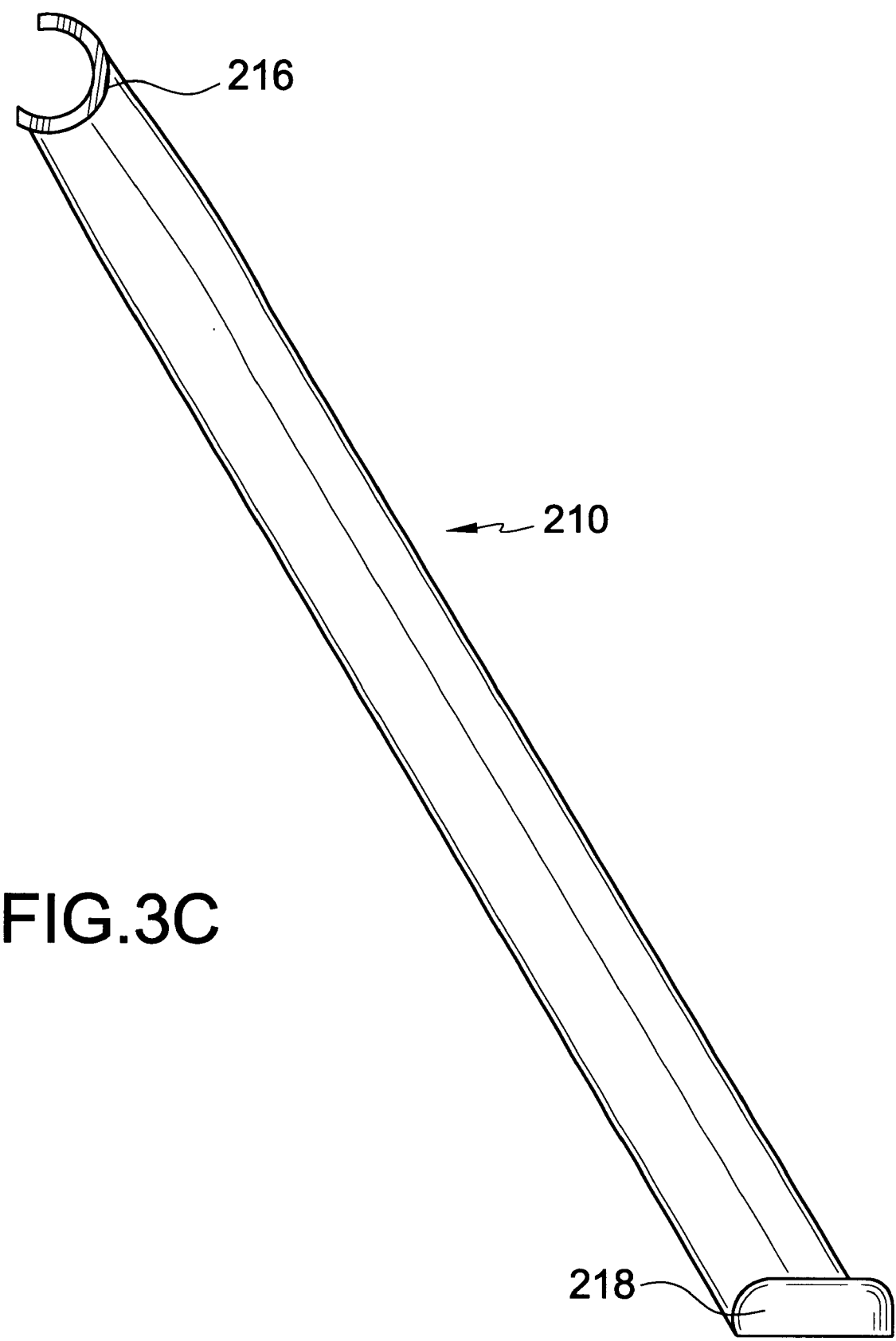
FIG. 3C is a side view of the stand in the extended position.
Figure 4:
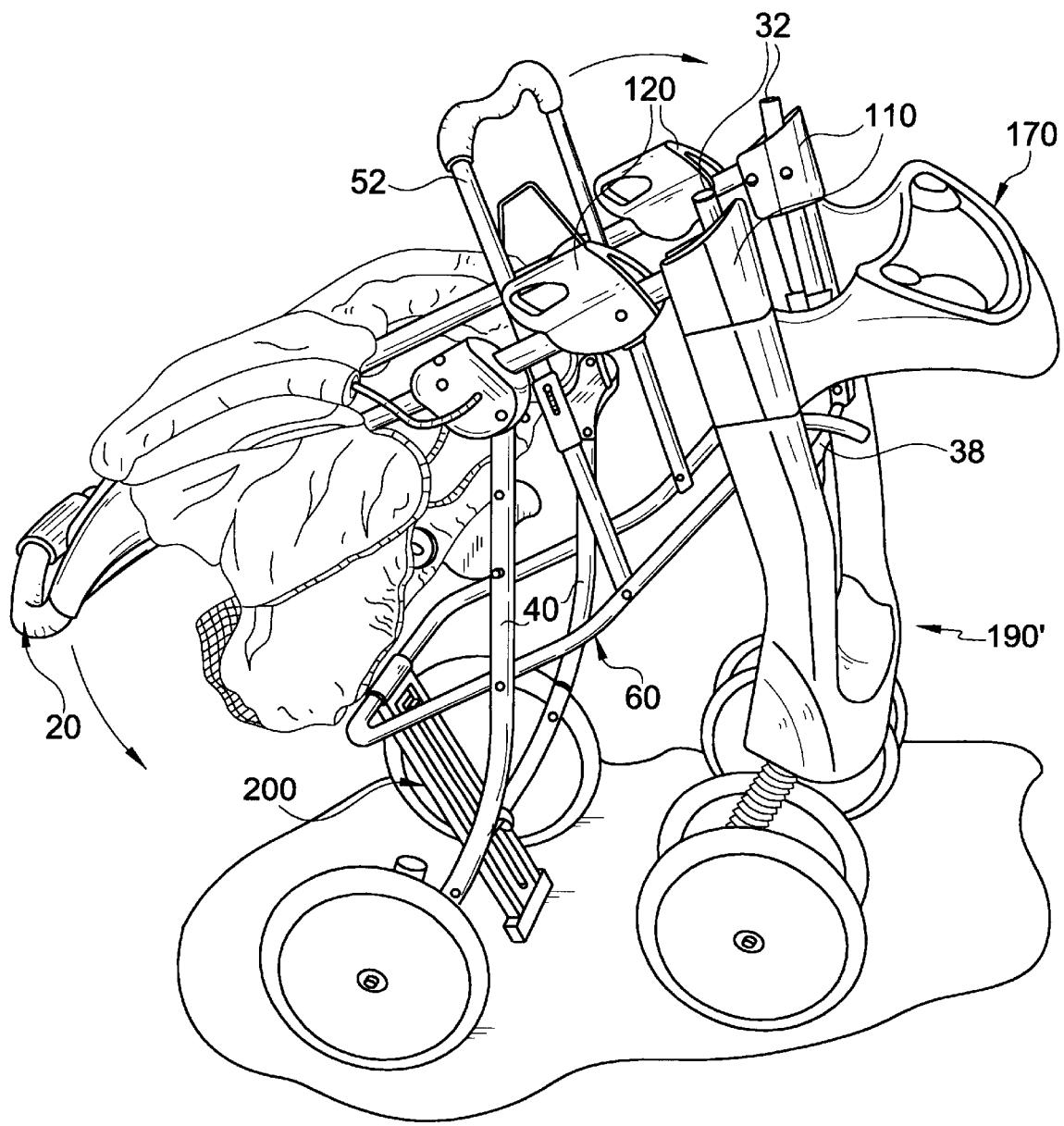
FIG. 4 is a perspective view of the stroller as it is being collapsed (intermediate position), with the canopy attached.

FIG. 1 shows the stand 200 when the stroller is in the use position. FIG. 4 shows the stand 200 as the stroller is being collapsed. FIG. 5 shows the stroller in the collapsed position. In the operating position, the stand guide 220 is positioned at or near the lower end of the slot 214, away from the larger slot 219. Thus, the elongated member 210 and the stand guide 220 remain connected. As the stroller is being collapsed, the handle frame 20 folds or pivots downwardly toward the rear legs 40, and the front legs 30 move toward the rear leg 40, as shown in FIG. 4. At the same time, the seat frame 60 rotates and becomes more vertical, as seen from FIGS. 4 and 5. As the seat frame 60 rotates, the intermediate rod 62 swings downwardly. Since the elongated member 210 is pivotally connected to the intermediate rod 62, the elongated member 210 is also displaced downwardly and can pivot as it is moving. The stand guide 220 guides the elongated member 210 downwardly so that it is resting at an acute angle relative to the vertical when the stroller is fully collapsed. See FIG. 3C. In this respect, the foot 218 can be angled complementary relative to the elongated beam 212. The length of the slot 214 is configured so that when the stroller is fully collapsed, the stand guide 220 is positioned closer to the larger (wider) slot 219, but positioned away therefrom so that the stand guide 220 and the elongated member 210 remain connected. When the stroller is collapsed, the latch 150 automatically locks the handle frame to the rear leg 40R, 40L to prevent the stroller 1 from unfolding.

The stand 200 is strategically positioned behind and below the seat frame 52, where the basket is positioned. The stand 200 is thus positioned behind the basket, and will not interfere with its use. When the stroller is in the collapsed position, as shown in FIG. 5, the stand 200 will maintain the stroller in the upright position. When the stroller is laid flat on the ground, such as when transporting or storing it, the elongated member 210 of the stand 200 will extend outwardly above or beyond the rear wheels. When the stroller is stored in a tight spot, such as a car trunk, it is possible for the trunk lid or door to abut against the outwardly extending foot 218. Other times, when the trunk is loaded, heavy objects, such as grocery bags, might rest on the elongated member 210.

The present stand 200 is removable and can disengage when a predetermined force is applied. For instance, before storing or transporting, the elongated member 210 can be manually disconnected from the seat frame 60. This allows the elongated member to freely slide inwardly or even to be removed entirely. When a heavy object rests on, or a door slams against, the elongate member 210, the connector 216 can pop off the seat frame 60. In this respect, the connector 216 can be configured so that the opening slot portion 216' of the C-shape collar faces the stroller pusher. More specifically, an imaginary plane cutting through the opening slot portion can be substantially vertical or angled slightly from the vertical when the stroller is fully collapsed. Assuming that the handle frame 20 is laid first on the ground, the elongated member 210 will extend upwardly and outwardly. If a vertical force is applied at the distal end (foot) of the elongated member 210, the elongated member 210 will act as a lever, using the stand guide 220 as a fulcrum, and transmit a greater force to the connector 216. By coinciding the opening slot portion 216' of the C-shaped collar with the line of force acting on the connector 216, the connector can be made to disconnect more easily. Similarly, when a door slams against the foot 218, the force will tend to rotate the elongated member 210 upwardly relative to the fulcrum point. In this instance, the fulcrum point will be at the stand guide 220 and the elongated member 210 will act to pull off the connector 216 from the seat frame 60.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

We claim:

1. A stroller comprising:
    a collapsible frame comprising:
        a handle frame;
        front right, front left, rear right, and rear left legs pivotally connected to the handle frame;
        a seat frame having an intermediate bar and right and left arms extending from the intermediate bar, the right arm being pivotally connected to the front and rear right legs and the left arm being pivotally connected to the front and rear left legs; and
        a cross brace connected to the rear right and left legs, wherein the collapsible frame is movable between a collapsed position and an operating position; and
    a stand connected to the cross brace and the intermediate bar, wherein the stand is movable between an extended position when the collapsible frame is in the collapsed position and a retracted position when the collapsible frame is in the operating position, the stand having a foot adapted to engage the ground or support when the stand is in the extended position to keep the collapsed frame in an upright position,
    wherein the stand comprises a stand guide arid an elongated member slidable relative to the stand guide, the elongated member having a first connector at one end and the foot at the opposite end, and the stand guide having a second connector, wherein one of the first and second connectors is connected to the intermediate bar and the other of the first and second connectors is connected to the cross brace.

2. A stroller according to claim 1, wherein the first connector is connected to the intermediate bar and the second connector is connected to the cross brace.

3. A stroller according to claim 1, wherein the elongated member has an opposing pair of flanges and a slot formed therebetween, the stand guide having opposing grooves that engage the flanges, the elongated member being slideably movable relative to the stand guide.

4. A stroller according to claim 3, wherein the slot has a wider portion adjacent the first connector, the wider slot portion being dimensioned to allow insertion and removal of the stand guide.

5. A stroller according to claim 4, wherein the wider slot portion has a keyhole and the stand guide has a complementary projection to allow insertion of the stand guide in a particular direction.

6. A stroller according to claim 1, wherein the first connector is pivotally and removably connected the intermediate bar and the second connector is pivotally and removably connected to the cross brace.

7. A stroller according to claim 6, wherein the first and second connectors each comprise a C-shaped collar.

8. A stroller according to claim 1, further including a latch that automatically latches the handle frame to one of the rear right and left legs upon the collapsible frame being moved to the collapsed position.

9. A stroller according to claim 8, wherein the latch comprises a flat resilient member having a slot attached to one of the handle frame and the rear right or left leg, and a pin extending from the other of the handle frame and the rear right or left leg, the pin engaging the slot to prevent the collapsible frame from moving to the operating position.

10. A stroller according to claim 1, further including an upper tray removably connected to the handle frame and a front tray removably connected to the front right and left legs.

11. A stroller according to claim 1, further including a footrest assembly removably attached to the collapsible frame to cover the front right and left legs.

12. A stroller according to claim 11, wherein the collapsible frame further includes at least one front cross brace connecting the front right and left legs, and the footrest assembly has a foot resting portion positioned between the front right and left legs, a substantially upright rear support extending contiguously and upwardly, angled from the foot resting portion, and right and left front leg shields extending along and over the front right and left legs respectively, wherein the footrest assembly has a first connector that detachably secures the footrest assembly to the front cross brace connecting the front legs and a second connector that secures the footrest assembly to the collapsible frame.

13. A stroller according to claim 1, wherein the stand guide and the elongated member both removably attached to the collapsible frame.

14. A stroller according to claim 13, wherein the first connector is pivotally and removably connected to the intermediate bar and the second connector is pivotally and removably connected to the cross brace.

15. A stroller according to claim 14, wherein the elongated member has an opposing pair of flanges and a slot formed therebetween, the stand guide having opposing grooves that engage the flanges, the elongated member being slideably movable relative to the stand guide.

16. A stroller according to claim 15, wherein the first and second connectors each comprise a C-shaped collar.

17. A stroller according to claim 15, wherein the slot has a wider portion adjacent the first connector, the wider slot portion being dimensioned to allow insertion and removal of the stand guide.

18. A stroller according to claim 17, wherein the wider slot portion has a keyhole and the stand guide has a complementary projection to allow insertion of the stand guide in a particular direction.

19. A stand for a stroller having a collapsible frame comprising a handle frame and front right, front left, rear right, and rear left legs pivotally connected to the handle frame; a seat frame having an intermediate bar and right and left arms extending from the intermediate bar, the right arm being pivotally connected to the front and rear right legs and the left arm being pivotally connected to the front and rear left legs; and a cross brace connected to the rear right and left legs, wherein the collapsible frame is movable between a collapsed position and an operating position, the stand comprising:

a stand guide adapted to be connected to the cross brace; and an elongated member adapted to be connected to the intermediate bar and slidably mounted to the stand guide, wherein the elongated member and the stand guide are detachable from the collapsible frame, wherein the elongated member is adapted to engage the ground or support when the collapsible frame is collapsed to keep the collapsed frame in an upright position, and wherein the elongated member has a first connector at one end connectable to the intermediate bar and a foot at the opposite end, the foot being adapted to engage the ground or support, and the stand guide has a second connector connectable to the cross brace.

20. A stand according to claim 19, wherein the elongated member has an opposing pair of flanges and a slot formed therebetween, the stand guide having opposing grooves that engage the flanges, the elongated member being slideably movable relative to the stand guide.

21. A stand according to claim 20, wherein the slot has a wider portion adjacent the first connector, the wider slot portion being dimensioned to allow insertion and removal of the stand guide.

22. A stand according to claim 21, wherein the wider slot portion has a keyhole and the stand guide has a complementary projection to allow insertion of the stand guide in a particular direction.

23. A stand according to claim 19, wherein the first connector is adapted to be pivotally and removably connected the intermediate bar and the second connector is adapted to be pivotally and removably connected to the cross brace.

24. A stand according to claim 23, wherein the first and second connectors each comprise a C-shaped collar.

* * * * *